(No Model.) 2 Sheets—Sheet 1.
J. W. BARLOW.
CORN PLANTER.
No. 510,231. Patented Dec. 5, 1893.
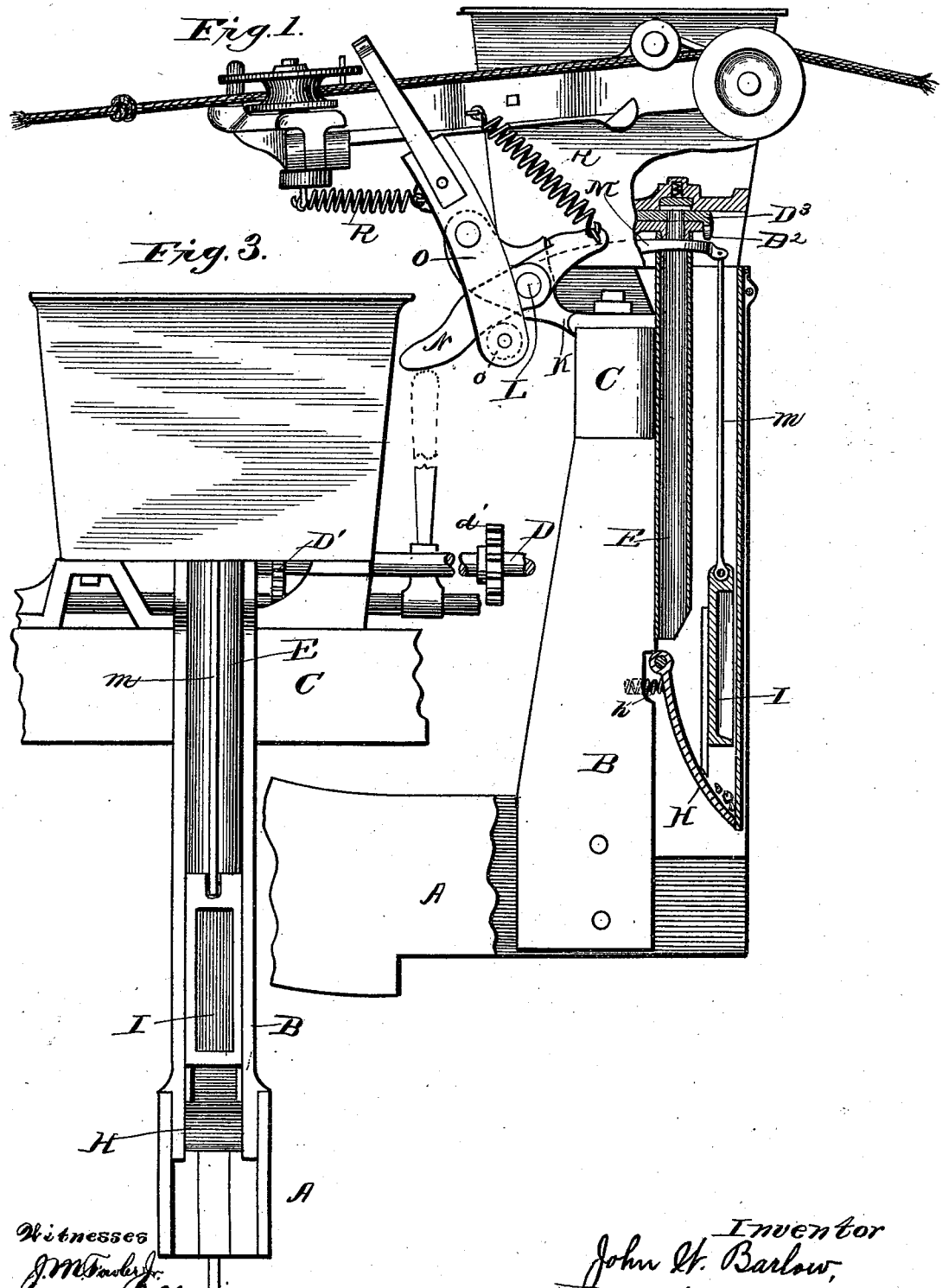
Witnesses
J. M. Fowler Jr.
Alex J. Stuart
Inventor
John W. Barlow,
By Church & Church
his Attorneys.

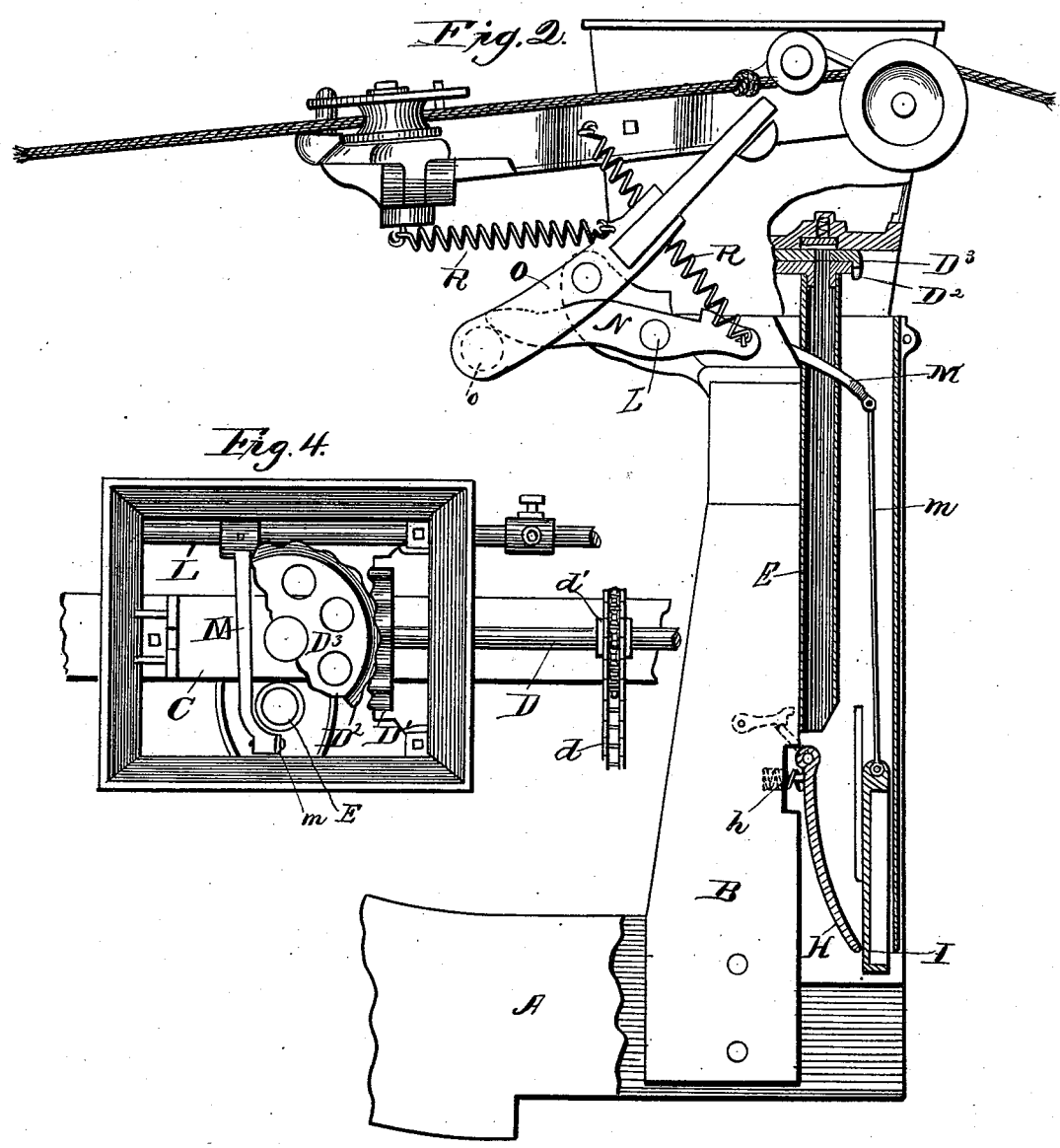

UNITED STATES PATENT OFFICE.

JOHN W. BARLOW, OF QUINCY, ILLINOIS.

CORN-PLANTER.

SPECIFICATION forming part of Letters Patent No. 510,231, dated December 5, 1893.

Application filed April 16, 1892. Serial No. 429,385. (No model.)

*To all whom it may concern:*

Be it known that I, JOHN W. BARLOW, of Quincy, in the county of Adams and State of Illinois, have invented certain new and useful Improvements in Corn-Planters; and I do hereby declare the following to be a full, clear, and exact description of the same, reference being had to the accompanying drawings, forming a part of this specification, and to the letters of reference marked thereon.

The invention in the present instance relates solely to the dropping mechanism of the planter, that is to say, the mechanism for dropping the kernels of grain from the seed box to the ground and controlling the rate of discharge, the objects being to drop the kernels in more perfect check, to force the kernels to drop at the desired points and to simplify and improve the mechanism as will presently appear.

The invention consists in certain novel details of construction and combinations and arrangements of parts as will be now described and pointed out particularly in the appended claims.

Referring to the accompanying drawings: Figure 1 is a side elevation partially in section of one side of the runner frame and seeding mechanism of a planter constructed in accordance with my present invention, a portion being broken away to show underlying parts. Fig. 2 is a similar view with the dropping mechanism actuated by the check wire. Fig. 3 is a rear elevation of one of the runner standards with the back plate removed. Fig. 4 is a detail top plan view.

Similar letters of reference in the several figures indicate the same parts.

In carrying the present invention into practice I have for convenience combined it with the planter known throughout the country as the "Barlow planter," although, as will be obvious to those skilled in the art, it may be combined with other planters of like character without such changes as would involve more than the exercise of ordinary skill.

One end only of the runner frame of the machine is shown, as it is sufficient to illustrate the invention, the letter A indicating a section of the runner or shoe, B the standard and C the cross piece to which the standard is secured and which carries the major part of the dropping mechanism. Journaled on the runner frame is a shaft D driven from the ground wheel (not shown) by the sprocket chain $d$ and wheel $d'$. On each end of shaft D is a gear wheel D' meshing with a corresponding wheel $D^2$ for driving the seed plate $D^3$ whereby the latter is rotated to feed the grain from the seed box in the ordinary manner. The special detail construction of this part of the machine is well known and needs no further description, sufficeth to say, that the grain is fed regularly from the seed box through a race way or tube E, down into the standard or into a box attached thereto and if no other mechanism were employed, would act as a drill to distribute the grain evenly throughout the row, but not in proper relation to the grain in previous rows so as to form transverse rows. It is of course desirable that the grain should be planted in hills, and in perfect check, in by far the larger part of the planting done, and to accomplish this, without in any way affecting the efficiency of the machine as a drill, I provide a supplemental check row mechanism by interposing a gate, cut off, or valve (H in the drawings) in the race way or passage through which the grain passes to the ground and a driver or plunger (I in the drawings) which at proper intervals positively discharges the accumulated grain directly onto the spot in the field where it is to remain. The cut-off gate H it will be seen, is located well down toward the bottom of the standard, leaving a very short drop for the grain after being discharged therefrom thus aiding in securing the accuracy aimed at. The gate is preferably elevated by a spring $h$ and depressed and the grain discharged by the driver or plunger I reciprocating vertically in grooves or guides in the standard and adapted to normally occupy the position shown in Fig. 1 somewhat above the cut off. When depressed by the check wire it descends over the grain and positively discharges the same directly on the desired spot, at the same time closing the aperture to prevent the passage of grain which might be fed by the seed plate while the gate is depressed. This driver or plunger action is highly important in that it forces the grains to drop all together and at exactly the desired spot, no straggling or "stringing" out of the kernels being possible and that, irrespective of the speed at which the team is driven for the plunger acts fast or slow in exact accordance with the speed of the team and drives the grain so to speak, directly to the ground. The drop is so short that the grains are not scattered nor do they take any appreciable time to travel from the gate to the ground.

The driver or plunger may be actuated by various mechanisms, but I have devised a simple, inexpensive and easily applied mechanism as follows: A bracket or support K is secured to each end of the cross piece and in them is journaled the driver or plunger actuating shaft L having arms M secured rigidly thereon in position for their bifurcated rear ends to extend approximately above the plunger to which they are connected by rods *m*. On the extreme ends of the shaft are secured cam actuating levers N, with which the forked lever O pivoted on a center to one side of the shaft is adapted to co-operate. In the preferred construction, the forked lever is pivoted between the ends and bears an anti-friction roller *o* on the lower shorter end, which engages and rides upon the cam lever, as the forked lever is moved from the position shown in Fig. 1 to the position shown in Fig. 2 rotating the shaft and actuating the driver or plunger as aforesaid. The forked lever it will be noted, needs move but a very short distance and it might be mounted directly on the shaft L, but to secure a quick actuation of the driver or cut off and for other obvious reasons, the arrangement shown is preferred. All the parts after being actuated by the check wire are returned to normal position by springs, of any approved character, such as R.

In operation the grain is fed down by the seed plate constantly in the ordinary manner for drilling, and the gate or cut-off receives and holds the kernels until the checking mechanism is actuated when they are discharged. The plunger just fills the opening through which the grain has passed, and as the plunger is elevated, the gate closes in beneath it and prevents the escape of any grain which might have been dropped while the plunger was depressed. It is usual to time and regulate the feed of the seed plate to feed three kernels of grain between each movement of the checking mechanism, but such feed may be regulated in any ordinary method to feed a greater or less number of kernels as will be readily understood.

Should it be desired at any time to operate the machine as a drill it is only necessary to open or remove the gate and if desirable to do the checking by hand it is only necessary to apply a hand lever, such as indicated in dotted lines, to the shaft L. The handle projects up in convenient position to be grasped and requires but a very slight rocking movement to actuate the dropping mechanism.

Any preferred form of cut-off and driver may be employed, for these elements are such that their form and location may be changed by one skilled in the art almost infinitely and still accomplish the important step of positively driving the grain to the ground. Hence I do not wish to be understood as limiting myself to the specific form shown.

Having thus described my invention, what I claim as new is—

1. In a check row planter, the combination with the runner, the chute or conduit leading to the heel of the runner and the valve controlling the passage between the seed box or hopper and said chute, of a gate or cut-off controlling the lower end of said chute near the ground, and a driver controlled by the check row cord or wire and operating upon the seed detained in the chute to forcibly and positively impel it toward the ground, and thus cause the seed to be properly placed irrespective of variations in the speed at which the team travels.

2. In a check row corn planter, the combination with the runner frame having the shoe for opening the soil, the channel or chute passing down in rear of the runner standard, the valve at the top of the chute, and the gate at the bottom of the same but above the bottom of the shoe, of the driver controlled by the check wire and cooperating with the gate and the grain held thereby to positively and forcibly eject or shoot the grain directly upon the earth within or directly in rear of the shoe or runner; substantially as described.

3. In a planter, the combination with the runner frame having the shoes for opening the soil, the channels passing down in rear of the runner standards, the valves at the top of the channels and the gates closing the channels at the bottom below the plungers, of the reciprocatory plungers working in the channels above the gates, the shaft carrying arms for operating the plungers, and the independently operating check wire levers for moving the shaft; substantially as described.

4. In a planter, the combination with the checking mechanism and the transverse operating shaft therefor, of the cam lever mounted on said shaft, and the forked lever for co-operation with the check wire, pivoted on an independent center and engaging the cam lever to move the operating shaft.

JOHN W. BARLOW.

Witnesses:
J. C. BARLOW Jr.,
L. B. BOSWELL.